United States Patent
Feng (10) Patent No.: US 8,670,347 B2
(45) Date of Patent: Mar. 11, 2014

(54) METHOD, DEVICE AND SYSTEM FOR AUTOMATICALLY DISCOVERING OPTICAL FIBRE CONNECTION WITHIN NETWORK ELEMENT

(75) Inventor: Kai Feng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 202 days.

(21) Appl. No.: 13/258,286

(22) PCT Filed: Apr. 19, 2010

(86) PCT No.: PCT/CN2010/071898
§ 371 (c)(1),
(2), (4) Date: Feb. 26, 2012

(87) PCT Pub. No.: WO2011/022975
PCT Pub. Date: Mar. 3, 2011

(65) Prior Publication Data
US 2012/0141126 A1    Jun. 7, 2012

(30) Foreign Application Priority Data
Aug. 27, 2009   (CN) .......................... 2009 1 0169609

(51) Int. Cl.
*H04L 12/28* (2006.01)
(52) U.S. Cl.
USPC ...................................................... 370/254
(58) Field of Classification Search
None
See application file for complete search history.

(56) References Cited

U.S. PATENT DOCUMENTS

| | | | |
|---|---|---|---|
| 2006/0277346 A1* | 12/2006 | Doak et al. ................... | 710/305 |
| 2007/0160039 A1 | 7/2007 | Xu | |
| 2008/0189426 A1 | 8/2008 | Xu | |
| 2009/0161681 A1 | 6/2009 | Madrahalli | |

FOREIGN PATENT DOCUMENTS

| | | |
|---|---|---|
| CN | 1881918 A | 12/2006 |
| CN | 101640822 A | 2/2010 |
| WO | 2007041939 A1 | 4/2007 |

OTHER PUBLICATIONS

International Search Report on international application No. PCT/CN2010/071898, mailed on Jul. 22, 2010.
English Translation of the Written Opinion of the International Search Authority in international application No. PCT/CN2010/071898, mailed on Jul. 22, 2010.

* cited by examiner

*Primary Examiner* — John Blanton
(74) *Attorney, Agent, or Firm* — Oppedahl Patent Law Firm LLC (57) ABSTRACT

A method, device and system for automatically discovering optical fiber connection within a network element are provided. In the method, a destination board determines whether it is connected with a source single board for the first time according to a triple group message received within a predefined period and sent by the source single board, and if yes, sends a sextuple group message generated based on its triple group message to an ASON, and stores the sextuple group message in a local database; otherwise, it sends the sextuple group message stored in the local database and corresponding to the triple group message, to the ASON when timing is reached; when receiving the sextuple group message and determining that the sextuple group message is not stored locally, the ASON detects validity of a connection corresponding to the sextuple group message, and locally stores the sextuple group message if the connection is valid, otherwise, displays connection error information to a user.

13 Claims, 5 Drawing Sheets

METHOD, DEVICE AND SYSTEM FOR AUTOMATICALLY DISCOVERING OPTICAL FIBRE CONNECTION WITHIN NETWORK ELEMENT

TECHNICAL FIELD

The disclosure relates to the field of communications, more particularly to a method, device and system for automatically discovering an optical fibre connection within a network element.

BACKGROUND

The concept of Automatically Switched Optical Network (ASON) was proposed by International Telecommunication Union in March, 2000. The basic idea is as follows: a control plane is introduced to an optical transport network to realize allocation of network resources on demands and thus to realize the intelligent optical network, which can thereby make the optical transport network developed into a network accessible to any users and any places, and such network is composed of thousands of switching nodes and millions of terminals and is an intelligent automatically switched optical network.

Routing technology is one of core technologies of the ASON, and plays a crucial role in performing the dynamic routing of a connection. Topology total sets that can be selected by ASON routing include a set of connections between network element nodes (called external routing) and a set of optical fibre connections within a network element (called internal routing). The computing method of the internal routing can use an add-drop direction constraint algorithm, which selects a proper internal path from the set of the optical fibre connections within the network element. However, configurations for the set of the optical fibre connections within the network element need be manually set one by one for an ASON module on network management so as to generate the total set. Due to the above manual configuration, the prior art has the following problems.

(1) Error proneness. The internal optical fibre connections configured for the ASON are inconsistent with actual physical optical fibre connections.

(2) Much more effort. For example, for a simple five network element (NE) with 80 wavelength and full configuration, about one thousand internal optical fibre connections should be configured for the ASON.

(3) Inconvenient to transition from a soft Permanent Connection (SPC) service to a Switch Connection (SC) service. In the SPC service, configurations for the internal optical fibre connection are issued from the network management, and in the SC service, a connection setup request is initiated by a client and it is required to be independent of configurations from the network management.

SUMMARY

The disclosure provides a method, device and system for automatically discovering optical fibre connections within a network element, which can solve problems such as the large amount of manual configuration data, error proneness, high maintenance cost and the like, which are caused by manually configuring a set of optical fibre connections within the network element in the prior art.

The disclosure provides a method for automatically discovering optical fibre connections within a network element, which comprises:

Step 1: a destination board determines whether the destination board is connected with a source single board for the first time according to a triple group message which is received in a predefined period and sent by the source single board, and if yes, the destination board sends a sextuple group message, which is generated by combining its own triple group message, to an Automatically Switched Optical Network (ASON), and stores the sextuple group message in a local database; otherwise, the destination board sends the sextuple group message, which is stored in the local database and corresponds to the triple group message, to the ASON when a timing is reached; and Step 2: when the ASON receives the sextuple group message and determines that the sextuple group message is not stored locally, it detects the validity of the connection corresponding to the sextuple group message, and it locally stores the sextuple group message if the connection is valid, otherwise, it displays connection error information to a user.

The triple group message sent by the source single board may comprise a source single board type, a source single board address and port number information of a sending port; and the triple group message of the destination board itself may comprise a destination board type, a destination board address and port number information of a receiving port.

The method provided by the disclosure further has the following features.

Step 1 may also comprise: when the destination board does not receive any message sent by the source single board in a predefined period and is not connected with the source single board for the first time, sending the sextuple group message, which is stored in the local database and corresponds to the triple group message of the source single board, to the ASON immediately, and deleting the sextuple group message in the local database.

Step 2 may further comprise: when the ASON determines that the sextuple group message is stored locally, determining whether the difference between the time when the sextuple group message is received and the time when the sextuple group message is stored locally is an integral multiple of the predefined time interval, if yes, continuing to receive the sextuple group message, otherwise, locally deleting the sextuple group message.

Step 1 may further comprise: when a message which is received by the is destination board in a predefined period and sent by the source single board is not the triple group message, discarding the triple group message.

The disclosure also provides a board, which comprises a message receiving module and a communication module, wherein the message receiving module is configured to determine whether the message receiving module is connected with a source single board for the first time according to a triple group message which is received in a predefined period and sent by the source single board, and if yes, send the sextuple group message, which is generated by combining its own triple group message, to the communication module, and store the sextuple group message in a local database; otherwise, send the sextuple group message, which is stored in the local database and corresponds to the triple group message, to the communication module when the timing is reached; and the communication module is configured to receive the sextuple group message sent by the message receiving module, and forwarding the sextuple group message to the ASON.

Further, the board provided by the disclosure may also comprise: a message periodically sending module, which is configured to send the triple group message of the board to a message receiving destination board periodically.

Further, the board provided by the disclosure also has the following features.

The message receiving module may also be configured to, when the message receiving module does not receive any message sent by the source single board in a predefined period and is not connected with the source single board for the first time, send the sextuple group message, which is stored in the local database and corresponds to the triple group message of the source single board, to the communication module, and delete the sextuple group message in the local database.

The message receiving module may also be configured to, when a message which is received in a predefined period and sent by the source single board is not the triple group message, discard the triple group message.

The disclosure also provides a system for automatically discovering optical fibre connections within a network element, which comprises: an ASON and a plurality of boards, wherein each board comprises:

a message receiving module, which is configured to determine whether the message receiving module is connected with a source single board for the first time according to a triple group message which is received in a predefined period and sent by the source single board, and if yes, send the sextuple group message, which is generated by combining its own triple group message, to the communication module and storing the sextuple group message in a local database; otherwise, send the sextuple group message, which is stored in the local database and corresponds to the triple group message, to the communication module when the timing is reached; and a communication module, which is configured to receive the sextuple group message sent by the message receiving module, and forward the sextuple group message to the ASON;

the ASON comprises:

a sextuple group message receiving module, which is configured to receive the sextuple group message sent by the board;

an ASON optical fibre connection identification module, which is configured to, when determining that the sextuple group message received by the sextuple group message receiving module is not stored locally, detect the validity of the connection corresponding to the sextuple group message, and locally store the sextuple group message if the connection is valid, otherwise, display connection error information to a user.

Further, the board may also comprise: a message periodically sending module, which is configured to send the triple group message of the board to a message receiving destination board periodically; and the ASON optical fibre connection identification module is also configured to, when determining that a sextuple group message received by the sextuple group message receiving module is stored locally, determine whether the difference between the time when the sextuple group message is received and the time when the ASON locally saves the sextuple group message is an integral multiple of the predefined time interval, if yes, trigger the sextuple group message receiving module, otherwise, locally delete the sextuple group message.

Compared with the prior art, the disclosure has the following advantages:

An internal optical fibre connection routing link list of a network element (NE) is automatically generated within an ASON by the method provided by the disclosure, which avoids repeated and complicated work during manual configuration. Moreover, automatic discovery of internal optical fibre connections realized in the scheme solves the last critical problem of SC connections based on realized board automatic discovery, link automatic discovery and neighbour automatic discovery.

DETAILED DESCRIPTION

The technical scheme in embodiments of the disclosure will be described below clearly and completely with reference to the accompanying drawings in the embodiments of the disclosure. Obviously, the embodiments described are only part of embodiments, rather than all of embodiments. On the basis of the embodiments of the disclosure, all the other embodiments obtained by one of ordinary skill in the art without creative effort are also included in the protection scope of the disclosure.

To solve the problems such as the large amount of manual configuration data, error proneness, high maintenance cost and the like, which are caused by manually is configuring the set of optical fibre connections within the network element in the prior art, an embodiment of the disclosure provides a method, device and system for automatically discovering optical fibre connections within a network element. By using the method, an actual physical optical fibre connection can be automatically discovered, all connection data are reported to the ASON, the ASON generates a total set of internal routing computing after identifying the data. Thereby, the method can solve the problems, such as error proneness and much more effort, and satisfies the last condition that SC service is independent of the network management for the transition from the SPC service to the SC service.

Figure 1:
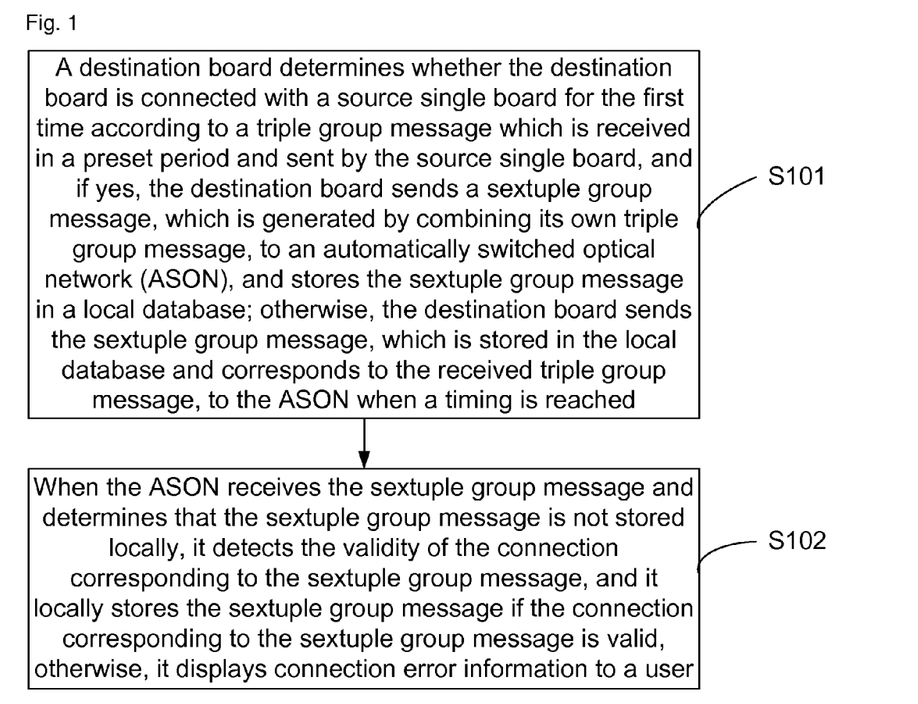
FIG. 1 shows a flowchart of a method for automatically discovering optical fibre connections within a network element according to an embodiment of the disclosure.

Specifically, an embodiment of the disclosure provides a method for automatically discovering optical fibre connections within a network element. As shown in FIG. 1, the method comprises the following steps.

Step S101: a destination board determines whether the destination board is connected with a source single board for the first time according to a triple group message which is received within a predefined period and sent by the source single board. If yes, the destination board sends a sextuple group message generated based on its own triple group message to an Automatically Switched Optical Network (ASON), and saves the sextuple group message in a local database; otherwise, the destination board sends, when timing is reached, the ASON a sextuple group message which is stored in the local database and corresponds to the received triple group message.

The triple group message sent by the source single board contains a source single board type, a source single board address and port number information of a sending port; and the triple group message of the destination board contains a destination board type, a destination board address and port number information of a receiving port.

In addition, the following operations may also be performed:

When the destination board does not receive any message sent by the source single board within a predefined period and is not connected with the source single board for the first time, the destination board sends the ASON the sextuple group message which is stored in the local database and corresponds to the triple group message of the source single board, and removes the sextuple group message from the local database.

When a message, which is received by the destination board within a predefined period and sent by the source single board, is not the triple group message, the received message is discarded.

Step S102: when receiving the sextuple group message and determining that the sextuple group message is not stored locally, the ASON checks validity of the connection corresponding to the sextuple group message, and locally stores the sextuple group message if the connection is valid, otherwise, displays connection error information to a user.

Further, when determining that the received sextuple group message is already stored locally, the ASON determines whether difference between time when the sextuple group message is received and time when the sextuple group message is locally stored is an integral multiple of the above timing interval, if yes, the ASON keeps receiving the sextuple group message, otherwise, the ASON removes the received sextuple group message from the ASON.

It should be noted that, the sextuple group message may be stored in a routing data link list within a local ASON network element in this step.

According to the method in this embodiment, an optical fibre connection routing link list within the network element is automatically generated within the ASON, which thus avoids repeated and complicated operations during the process of manually issuing configurations from the network management. Moreover, automatic discovery of internal optical fibre connections in this embodiment solves the last critical problem of connections based on board automatic discovery, link automatic discovery and neighbour automatic discovery.

A detailed implementation process of the disclosure will be described in detail below through a preferred embodiment.

Figure 2:
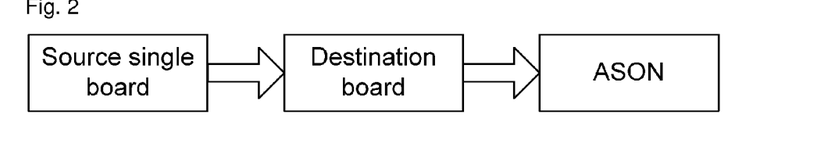
FIG. 2 shows a schematic data flow diagram of automatic discovery according to an embodiment of the disclosure.

In an embodiment of the disclosure functions of each single board of the wavelength division ASON network element and the ASON are extended. Generally, a destination board determines whether the destination board is connected with a source single board for the first time according to a triple group message which is received within a predefined period and sent by the source single board, and if yes, the destination board sends a sextuple group message which is generated based on its own triple group message to an Automatically Switched Optical Network (ASON), and stores the sextuple group message in a local database; otherwise, the destination is board sends, when timing is reached, the ASON the sextuple group message which is stored in the local database and which corresponds to the triple group message; when receiving the sextuple group message and determining that the sextuple group message is not stored locally, the ASON detects the validity of the connection corresponding to the sextuple group message, and locally stores the sextuple group message if the connection is valid, otherwise, the ASON displays connection error information to a user. Specific data flow for this embodiment is as shown in FIG. 2.

Figure 3:
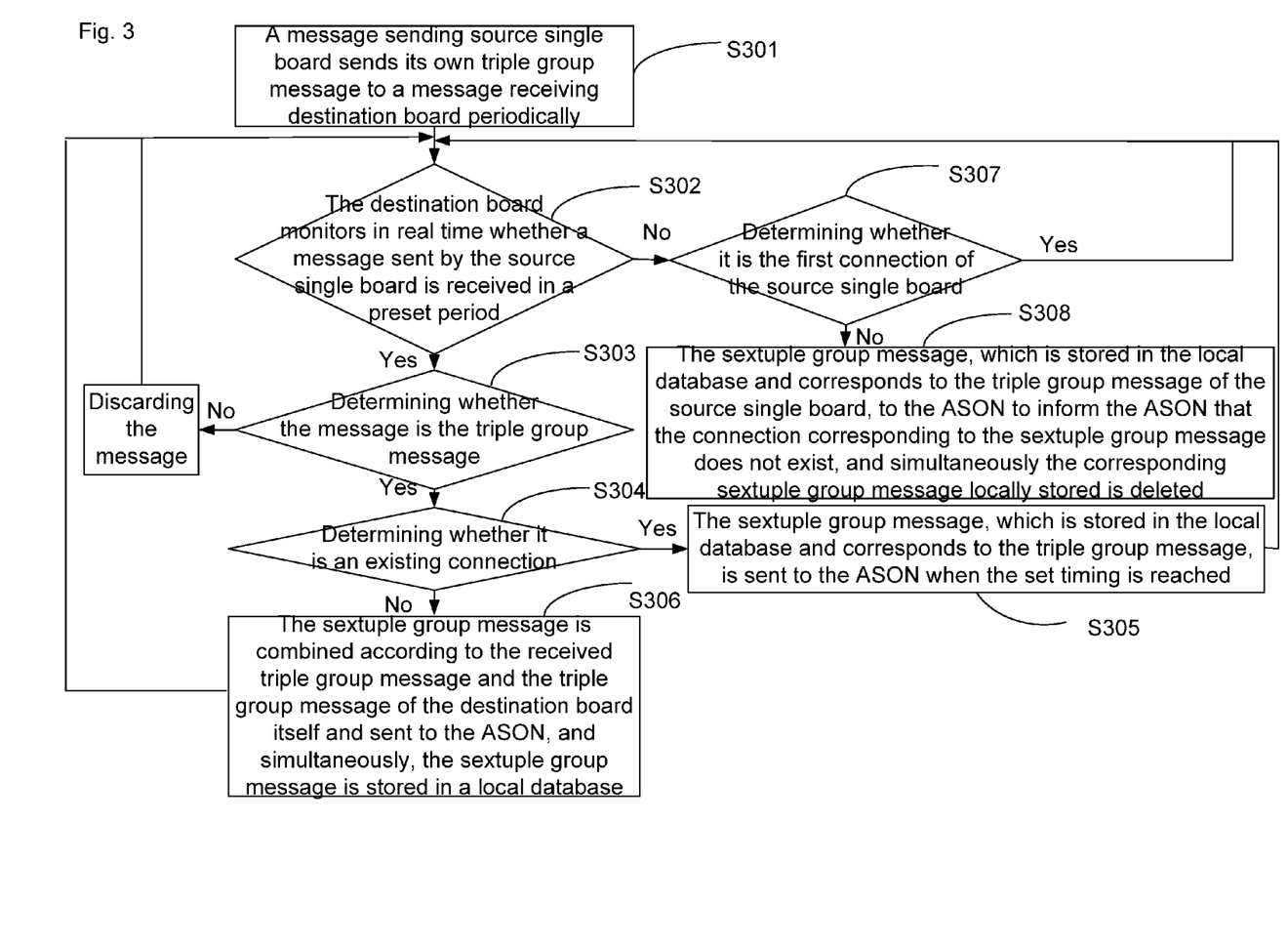
FIG. 3 shows a flowchart of a method for automatically discovering optical fibre connections within a network element processed on a single board side in an embodiment of the disclosure.

Specifically, FIG. 3 shows the detailed implementation process of a method for automatic discovery of optical fibre connections within a wavelength division ASON network element on a board side according to an embodiment of the disclosure. As shown in FIG. 3, the method comprises the followings steps.

Step S301: a message sending source single board sends its own triple group message to a message receiving destination board periodically. The triple group message contains a source single board type, a source single board address and port number information of a source single board sending port.

It should be noted that, the period in the step can be set according to specific requirements, and would not be restricted herein.

Step S302: the destination board monitors in real time whether a message sent by the source single board is received within a predefined period, if yes, proceeds to step S303, otherwise, proceeds to step S307.

The predefined period in step S302 is the same as the period in step S301, but in consideration of system delay or the like, the period in step S302 can be slightly longer than that in step S301.

Step S303: the received message is parsed to check whether the received message is the triple group message, if yes, step S304 is performed, otherwise, the received message is discarded and then step S302 is performed.

Step S304: the received triple group message is compared with the first three items of information stored in the local database to confirm whether it is an existing connection, if yes, step S305 is performed, otherwise, step S306 is performed.

Step S305: the sextuple group message which is stored in the local database and corresponds to the triple group message is sent to the ASON when the set timing is reached.

The timing is interval time information which indicates time after receiving the triple is group message for the first time and which uses a specific period of time as a cycle. For example, after receiving the triple group message for the first time, when receiving the triple group message sent by the source single board in the subsequent continuous periods, the destination board does not send the sextuple group message which is stored and which corresponds to the triple group message, to the ASON immediately, but instead, after receiving the message for the first time, the destination board sends the locally stored sextuple group message to the ASON when a specified time period (e.g., 20 min) is reached. Certainly, after sending the sextuple group message within this 20 min, then the destination board sends the sextuple group message to the ASON again every 20 min. In a similar way, after establishing the first connection, if the connection between the source single board and the destination board is good, the destination board will send the sextuple group message of the source single board corresponding to the destination board to the ASON every 20 min. The sextuple group message is sent to inform the ASON that the connection between the source single board and the destination board is good.

Step S306: the sextuple group message is generated based on the combination of the received triple group message and the triple group message of the destination board and is sent to the ASON, and simultaneously, the sextuple group message is stored in a local database of the destination board, then return to step S302.

The triple group message of the destination board itself contains a destination board type, a destination board address and port number information of a destination board receiving port.

Step S307: it is checked whether it is the first connection between the destination board and the source single board; if yes, return to step S302, otherwise, proceed to step S308.

The first connection means that: the destination board has never been connected to the source single board previously and this connection is the first connection between them; or, the destination board has ever been connected to the source single board previously, but is disconnected from the source single board for some reason, and now is connected again.

Step S308: the sextuple group message which is stored in the local database and which corresponds to the triple group message of the source single board is to the ASON to inform the ASON that the connection corresponding to the sextuple group is message does not exist, and simultaneously a corresponding sextuple group message locally stored is deleted.

It should be noted that, the message sent by the destination board to the ASON is in a standard format between the board and the ASON, and there is no technical problem here.

Figure 4:
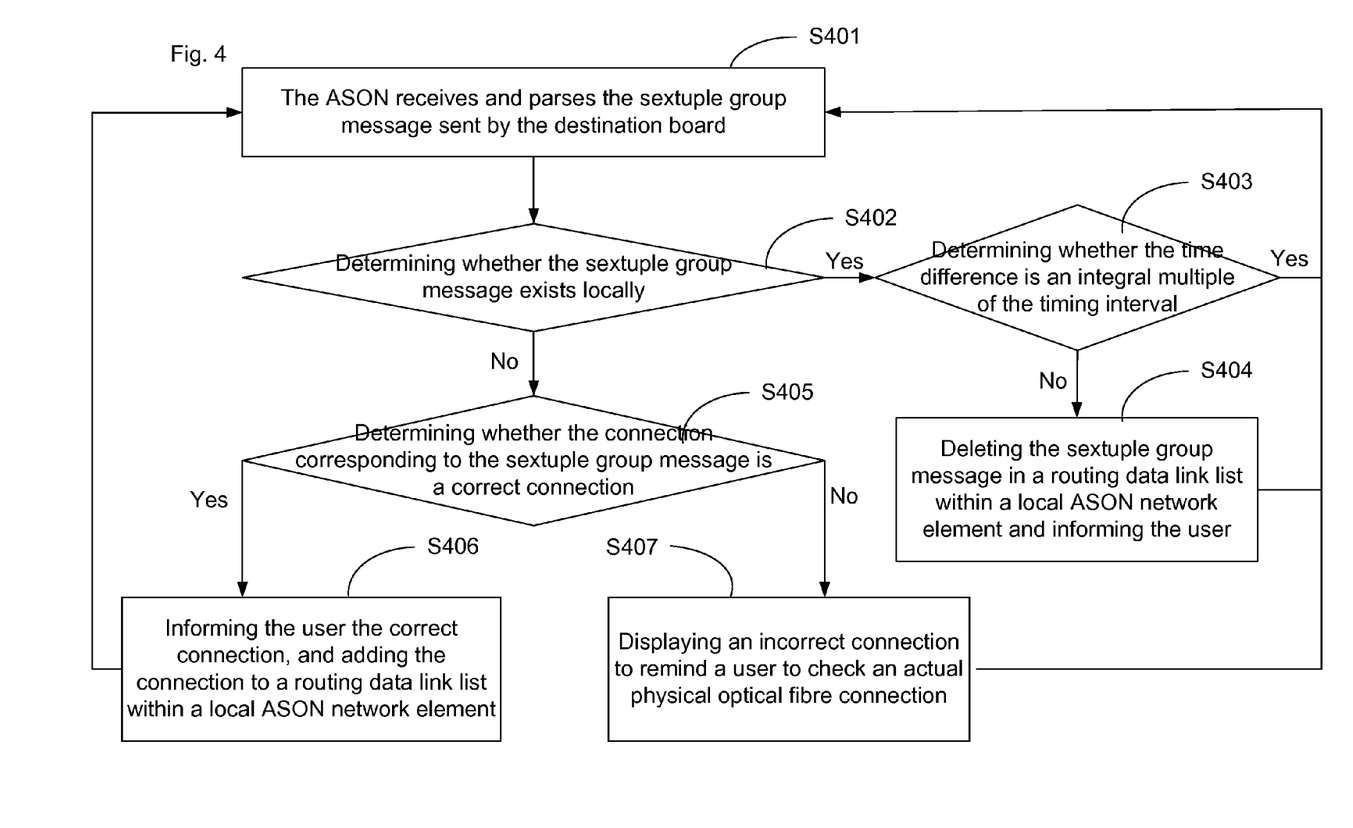
FIG. 4 shows a flowchart of a method for automatically discovering optical fibre connections within a network element processed on an ASON side in an embodiment of the disclosure.

The detailed implementation process of a method for automatic discovery of optical fibre connections within a wavelength division ASON network element on an ASON side according to an embodiment of the disclosure will be described in detail below. As shown in FIG. 4, the method comprises the following steps.

Step S401: the ASON receives and parses the sextuple group message sent by the destination board.

Step S402: it is checked whether the sextuple group message exists in a routing data link list within a local ASON network element, if yes, proceed to step S403; otherwise, proceed to step S405.

Step S403: it is checked whether the difference between the time when the sextuple group message is received and the time when the sextuple group message is stored in a routing data link list within a local ASON network element is an integral multiple of the timing interval, if yes, return to step S401; otherwise, proceed to step S404.

Step S404: it is determined that the connection corresponding to the sextuple group message does not exist, the sextuple group message is removed from a routing data link list within a local ASON network element and the user is notified, and then return to step S401.

Step S405: the sextuple group message received this time is identified according to an optical fibre connection identification rule generated in advance so as to determine whether the connection corresponding to the sextuple group message is a correct connection, if yes, proceed to step S406; otherwise, proceed to step S407.

The optical fibre connection identification rule is generated based on a board message and existing experience knowledge. The board message herein is within a network element and is discovered by an ASON through an internal ASON board automatic discovery module. The identification rule is a rule for matching the single board address, the single board type and the port number.

Step S406: the user is informed that the connection is a correct connection and the connection is added to a routing data link list within a local ASON network element, and then return to step S401.

Step S407: connection error information is displayed to prompt a user to check an actual physical optical fibre connection, return to step S401.

The connection error may be described as, for example, if a source port is a transmit port and a sink port is also a transmit port, the connection is an incorrect connection; or, if the source single board is OUT and the destination board is WSU/D, etc.

In order to more clearly describe the technical scheme of the disclosure, the implementation process of the method in the disclosure is further specified through an example of optical fibre connections within a wavelength division ASON network element.

Figure 5:
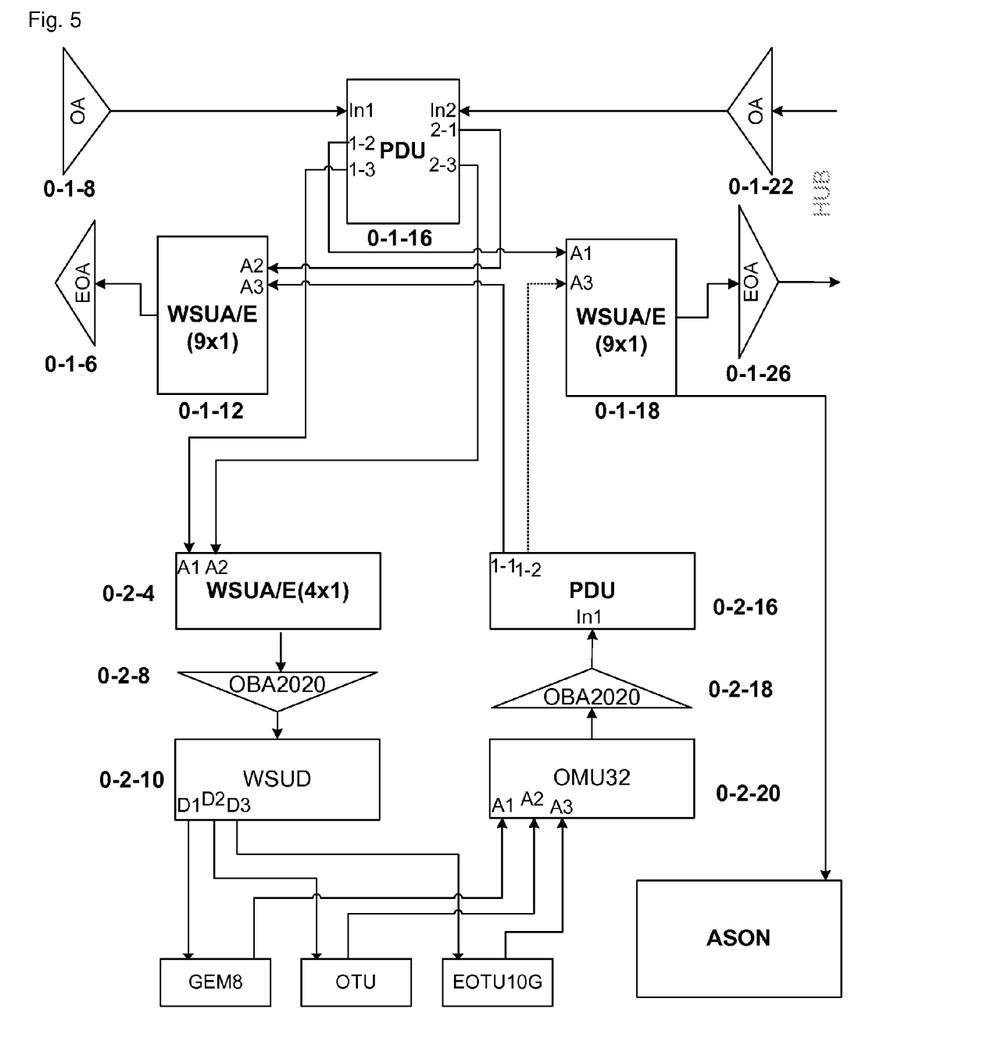
FIG. 5 shows a schematic diagram of an example of optical fibre connections within a network element according to an embodiment of the disclosure.

According to the embodiment of the disclosure, all the optical fibre connections within a network element are discovered, and are then reported to an ASON through a communication channel between the board and the ASON; and the ASON identifies the connections reported. FIG. 5 is a schematic diagram of optical fibre connections within a network element in the example. As shown in FIG. 5, an instance of an optical fibre connection is shown by a dotted line, representing that the optical fibre is connected to A3 port of a WSU board of 0-1-18 address (subrack 1, slot 18) from 1-2 port of a PDU board of 0-2-16 address (subrack 2, slot 16). In the detailed implementation process, a new wavelength can be loaded on a main optical channel represented by the dotted line in the figure, and can function as a physical channel for bearing the triple group message of the source single board sent via a transmit port. But data on the communication channel between the board within the network element and the ASON, as shown in the figure, no longer run through an SNP board.

Detailed processes of automatically discovering optical fibre connections within a network element are as follows:

Taking the PDU board of 0-2-16 address (subrack 2, slot 16) shown in FIG. 5 as an example, the (1-2) port of PDU modulates a triple group message, i.e., its own board type (PDU), board address (0-2-16) and port number (1-2) of sending port, to a carrier wavelength in a timing way, and sends it to the destination board WSU (0-1-18).

The A3 port of WSU monitors a message sent from a peer end, parses the message if receiving the message, and if the message is a triple group message and received for the first time, combines the message with the board type (WSU), board address (0-1-18) of the destination board and port number (A3) of receiving port into a sextuple group message, and sends the sextuple group message to an ASON; if the message is not triple group message, discards the message.

The ASON receives a message sent by the board WSU, parses the message to obtain the sextuple group message therein, and analyses the sextuple group message according to an optical fibre connection identification rule (e.g., PDU can be connected to WSU) to confirm that this is a correct optical fibre connection. The validity of the connection is displayed by a command line or the like to a user within the ASON, and simultaneously, the connection is added to a routing data link list within an ASON network element.

Figure 6:
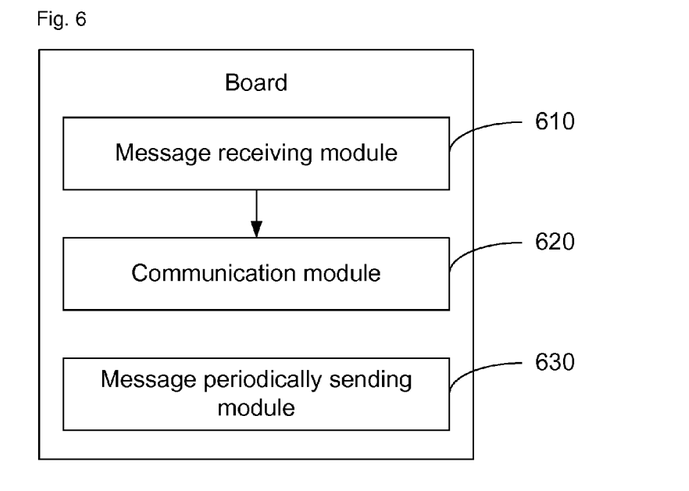
FIG. 6 shows a structural diagram of a board according to an embodiment of the disclosure.

An embodiment of the disclosure also provides a board. As shown in FIG. 6, the board comprises a message receiving module 610 and a communication module 620.

The message receiving module 610 is configured to determine, according to a triple group message which is received in a predefined period and sent by the source single board, whether the message receiving module is connected with a source single board for the first time; if yes, send a sextuple group message which is generated based on its own triple group message to the communication module 620, and store the sextuple group message in a local database; otherwise, when the timing is reached, send the communication module 620 a sextuple group message which is stored in the local database and which corresponds to the received triple group message;

The communication module 620 is configured to receive the sextuple group message sent by the message receiving module 610, and forward the sextuple group message to the ASON.

Further, the board according to the embodiment of the disclosure also comprises:

a message periodically sending module 630, which is configured to periodically send the triple group message of the board to a message receiving destination board.

The board provided by the disclosure also has the following features.

The message receiving module 610 is also configured to, when the message receiving module 610 does not receive any message sent by the source single board within a predefined period and is not connected with the source single board for the first time, send the communication module 620 the sextuple group message which is stored in the local database and which corresponds to the triple group message of the source single board, and remove the sextuple group message from the local database.

The message receiving module 610 is also configured to, when a message which is received within a predefined period and sent by the source single board is not the triple group message, discard the message.

Figure 7:
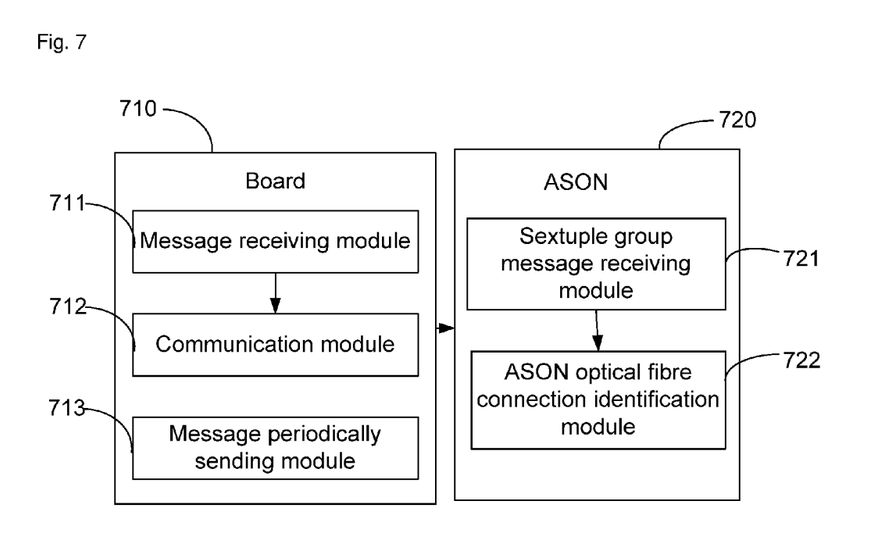
FIG. 7 shows a structural diagram of a system for automatically discovering optical fibre connections within a network element according to the disclosure.

An embodiment of the disclosure also provides a system for automatically discovering optical fibre connections within a network element. As shown in FIG. 7, the system comprises: a plurality of boards 710 and an ASON 720.

Each of boards 710 comprises:

a message receiving module 711, configured to determine whether the message receiving module is connected with a source single board for the first time according to a triple group message which is received within a predefined period and which is sent by the source single board; if yes, send a sextuple group message which is generated based on its own triple group message to a communication module 712 and store the sextuple group message in a local database; otherwise, when the timing is reached, send the communication module 712 the sextuple group message which is stored in the local database and which corresponds to the triple group message; and a communication module 712, configured to receive the sextuple group message sent by the message receiving module 711, and forward the sextuple group message to the ASON 720.

The ASON 720 comprises:

a sextuple group message receiving module 721, configured to receive the sextuple group message sent by the board 710; and an ASON optical fibre connection identification module 722, configured to, when determining that the sextuple group message received by the sextuple group message receiving module 721 is not stored locally, detect the validity of the connection corresponding to the sextuple group message, and locally store the sextuple group message if the connection is valid; otherwise, display connection error information to a user.

In addition, in the system provided by the embodiment of the disclosure, the board 710 also comprises: a message periodically sending module 713, configured to is periodically send the triple group message of the board to a message receiving destination board.

Meanwhile, the ASON optical fibre connection identification module 722 is also configured to, when determining that a sextuple group message received by the sextuple group message receiving module 721 is stored locally, determine whether the difference between the time when the sextuple group message is received and the time when the ASON locally saves the sextuple group message is an integral multiple of a predefined time interval; if yes, trigger the sextuple group message receiving module 721; otherwise, remove the sextuple group message from the local.

Obviously, those skilled in the art can make various modifications and variations without departing from the scope of the disclosure. In such a way, if these modifications and variations of the disclosure fall within the scope of the claims of the disclosure and equivalent technology thereof, the disclosure is intended to contain these modifications and variations.

What is claimed is:

1. A method for automatically discovering an optical fibre connection within a network element, comprising:

determining, by a destination board, whether the destination board is connected with a source single board for the first time according to a triple group message which is received within a predefined period and which is sent by the source single board; if yes, generating, by the destination board, a sextuple group message according to the triple group message sent by the source single board and a triple group message of the destination board, sending the sextuple group message to an Automatically Switched Optical Network (ASON), and storing the sextuple group message in a local database; otherwise, sending, by the destination board when timing is reached, the ASON the sextuple group message which is stored in the local database and which corresponds to the triple group message sent by the source single board; and when receiving the sextuple group message sent by the destination board and determining that the sextuple group message is not stored locally, detecting, by the ASON, validity of a connection corresponding to the sextuple group message, locally storing the sextuple group message if the connection is valid, and outputting connection error information if the connection is invalid.

2. The method according to claim 1, wherein the triple group message sent by the source single board comprises a source single board type, a source single board address and port number information of a sending port; and the triple group message of the destination board comprises a destination board type, a destination board address and port number information of a receiving port.

3. The method according to claim 2, further comprising: when the destination board does not receive any message sent by the source single board within a predefined period and is not connected with the source single board for the first time, sending, by the destination board, the ASON the sextuple group message which is stored in the local database and which corresponds to the triple group message sent by is the source single board, and removing the sextuple group message from the local database.

4. The method according to claim 3, further comprising: when the ASON determines that the sextuple group message received is the same as a sextuple group message stored locally, determining, by the ASON, whether difference between time when the sextuple group message is received and time when the sextuple group message is locally stored is an integral multiple of the predefined period, and if no, deleting the sextuple group message from the ASON.

5. The method according to claim 1, further comprising: when the destination board does not receive any message sent by the source single board within a predefined period and is not connected with the source single board for the first time, sending, by the destination board, the ASON the sextuple group message which is stored in the local database and which corresponds to the triple group message sent by the source single board, and removing the sextuple group message from the local database.

6. The method according to claim 5, further comprising: when the ASON determines that the sextuple group message received is the same as a sextuple group message stored locally, determining, by the ASON, whether difference between time when the sextuple group message is received and time when the sextuple group message is locally stored is an integral multiple of the predefined period, and if no, deleting the sextuple group message from the ASON.

7. The method according to claim 1, further comprising: when a message which is received by the destination board within a predefined period and sent by the source single board is not the triple group message, discarding, by the destination board, the message received.

8. A board, comprising a database, a message receiving module and a communication module; wherein
the message receiving module is configured to determine whether the message receiving module is connected with a source single board for the first time according to a triple group message which is received within a predefined period and which is sent by the source single board; if yes, generate a sextuple group message according to the triple group message sent by the source single board and a triple group message of the board, send the sextuple group message to the communication module, and store the sextuple group message in a local database of the board; otherwise, send, when the predefined period is reached, the communication module the sextuple group message which is stored in the local database of the board and which corresponds to the triple group message; and
the communication module is configured to receive the sextuple group message sent by the message receiving module, and forward the sextuple group message to an Automatically Switched Optical Network (ASON).

9. The board according to claim 8, further comprising: a message periodically sending module, configured to periodically send the triple group message of the board where the message periodically sending module is arranged to a message receiving destination board.

10. The board according to claim 9, wherein the message receiving module is further configured to, when the message receiving module does not receive any message sent by the source single board within a predefined period and is not connected with the source single board for the first time, send the communication module the sextuple group message which is stored in the local database of the board and which corresponds to the triple group message of the source single board, and remove the sextuple group message from the local database of the board; and
the message receiving module is further configured to, when a message which is received within a predefined period and sent by the source single board is not the triple group message, discard the triple group message received.

11. The board according to claim 8, wherein the message receiving module is further configured to, when the message receiving module does not receive any message sent by the source single board within a predefined period and is not connected with the source single board for the first time, send the communication module the sextuple group message which is stored in the local database of the board and which corresponds to the triple group message of the source single board, and remove the sextuple group message from the local database of the board; and
the message receiving module is further configured to, when a message which is received within a predefined period and sent by the source single board is not the triple group message, discard the triple group message received.

12. A system for automatically discovering optical fibre connections within a network element, comprising: an Automatically Switched Optical Network (ASON) and a plurality of boards;
wherein each of the boards comprises:
a message receiving module, configured to determine whether the message receiving module is connected with a source single board for the first time according to a triple group message which is received within a predefined period and which is sent by the source single board; if yes, generate a sextuple group message according to the triple group message sent by the source single board and a triple group message of is the board, send the sextuple group message, and store the sextuple group message in a local database of the board; otherwise, send, when the predefined period is reached, the communication module the sextuple group message which is stored in the local database of the board and which corresponds to the triple group message; and
a communication module, configured to receive the sextuple group message sent by the message receiving module, and forward the sextuple group message to the ASON;
wherein the ASON comprises:
a sextuple group message receiving module, configured to receive the sextuple group message forwarded by the board; and
an ASON optical fibre connection identification module, configured to, when determining that the sextuple group message received by the sextuple group message receiving module is not stored locally, detect validity of a connection corresponding to the sextuple group message, and locally store the sextuple group message if the connection is valid; otherwise, display connection error information to a user.

13. The system according to claim 12, wherein each of the board further comprises:
a message periodically sending module, configured to periodically send the triple group message of the board to a message receiving destination board; and
wherein the ASON optical fibre connection identification module is further configured to, when determining that the ASON stores a sextuple group message the same as the sextuple group message received by the sextuple group message receiving module, determine whether difference between time when the sextuple group message is received and time when the ASON locally saves the sextuple group message is an integral multiple of the predefined period; if no, remove the sextuple group message from the ASON.

* * * * *